United States Patent
Seitz et al.

[19]

[11] Patent Number: 6,153,168
[45] Date of Patent: Nov. 28, 2000

[54] METHOD OF MANUFACTURING SULPHURIC ACID

[75] Inventors: Ekkehart Seitz, Seeheim-Jugenheim; Hermann Müller, Kulmbach; Georg Schmidt, Frankfurt am Main, all of Germany

[73] Assignee: Metallgesellschaft Aktiengesillschaft, Frankfurt/Main, Germany

[21] Appl. No.: 09/214,776

[22] PCT Filed: Jul. 3, 1997

[86] PCT No.: PCT/EP97/03520

§ 371 Date: Jan. 8, 1999

§ 102(e) Date: Feb. 5, 1999

[87] PCT Pub. No.: WO98/02380

PCT Pub. Date: Jan. 22, 1998

[30] Foreign Application Priority Data

Jul. 12, 1996 [DE] Germany ............................ 196 28 169

[51] Int. Cl.[7] .......................... C01B 17/74; C01B 17/775
[52] U.S. Cl. .......................... 423/522; 423/529; 423/533
[58] Field of Search .................... 423/522, 529, 423/533

[56] References Cited

U.S. PATENT DOCUMENTS

| | | | |
|---|---|---|---|
| 3,755,549 | 8/1973 | Guth | 423/533 |
| 3,803,297 | 4/1974 | Guth et al. | 423/522 |
| 5,118,490 | 6/1992 | McAlister | 423/522 |

FOREIGN PATENT DOCUMENTS

| | | |
|---|---|---|
| 0 028 848 A1 | 5/1981 | European Pat. Off. . |
| 0 062 930 A1 | 10/1982 | European Pat. Off. . |
| 0 101 110 A1 | 2/1984 | European Pat. Off. . |
| 607216 | 12/1934 | Germany . |
| 1792015 | 10/1971 | Germany . |
| 25 19 928 B2 | 11/1976 | Germany . |
| 31 09 847 A1 | 9/1982 | Germany . |
| WO91/14651 | 10/1991 | WIPO . |

*Primary Examiner*—Steven P. Griffin
*Assistant Examiner*—Timothy C Vanoy
*Attorney, Agent, or Firm*—Herbert Dubno; Jonathan Myers

[57] ABSTRACT

A process is provided for manufacturing sulfuric acid from a gas containing sulfur dioxide and steam. The sulfur dioxide and steam containing gas is subjected to a catalytic oxidation to convert the sulfur dioxide into sulfur trioxide so as to produce a gas having a sulfur trioxide to steam mole ratio of at least 1:1 at a temperature of 400 to 600° C. This sulfur trioxide and steam containing gas is injected into an indirect heat exchanger where it is indirectly cooled with a cooling fluid so that at least 80 percent of the theoretically possible sulfuric acid is formed and condensed in this heat exchanger. The cooling fluid exiting the heat exchanger is fed into a turbine for the generation of electricity. The gas mixture exiting the heat exchanger is contacted with sulfuric acid in a separate contact vessel to form additional, concentrated sulfuric acid. The sulfuric acid formed in the heat exchanger is discharged.

5 Claims, 2 Drawing Sheets

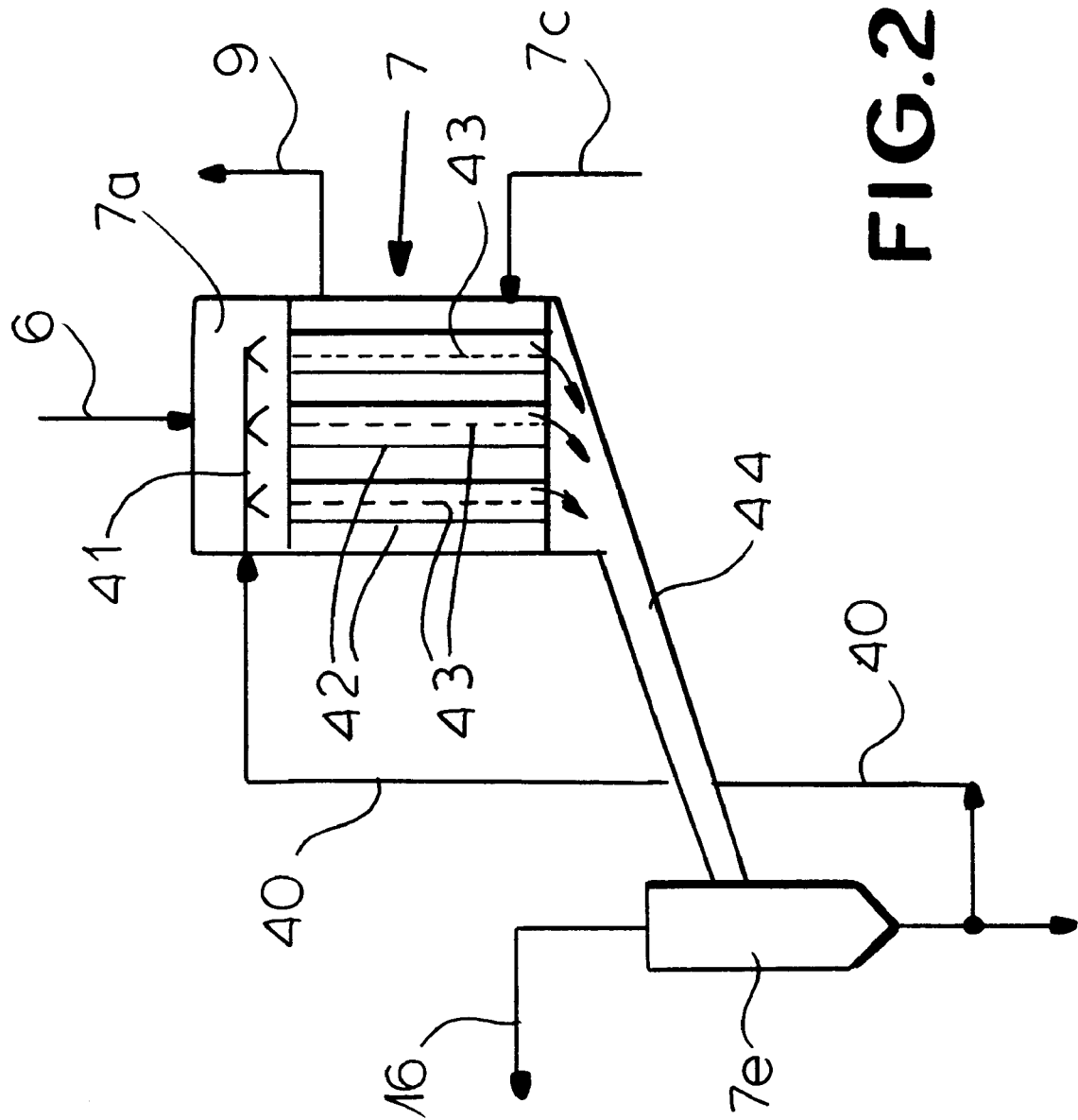

METHOD OF MANUFACTURING SULPHURIC ACID

This invention relates to a process of producing sulfuric acid from a steam-containing gas mixture, which contains $SO_3$ and $H_2O$ in a molar ratio of at least 1:1 and comes from a catalytic $SO_2$ oxidation with a temperature of 300–600° C.

Many variants of the production of sulfuric acid and details an various process stages, e.g. also on the catalytic $SO_2$ oxidation, are described in Ullmann's Encyclopedia of Industrial Chemistry, 5th Edition, Vol. A25, pp. 647–664. It is the object of the invention to produce sulfuric acid as inexpensively as possible. This process should allow for making use of the energy of the steam-containing gas mixture, which comes from the catalytic $SO_2$ oxidation.

In accordance with the invention, this is achieved in the above-mentioned process in that the gas mixture containing $SO_3$ and steam is passed through a condenser, in which the gas mixture is indirectly cooled by means of a cooling fluid to a temperature of 180–240° C. at the outlet of the condenser, where at least 50% of the theoretically possible sulfuric acid are formed, condensed and discharged, and the cooling fluid, which has been heated to a temperature of at least 130° C., is withdrawn from the condenser, and that an $SO_3$-containing gas mixture is withdrawn from the condenser, the gas mixture is brought in contact with concentrated sulfuric acid at a temperature of 60–120° C., and concentrated product sulfuric acid is withdrawn. The cooling fluid used in the condenser may be liquid or gaseous, and it can for instance be cooling water or air.

When the cooling fluid supplied to the condenser is water, steam of 2.5 to 10 bar is generated in the condenser, which steam is a valuable product. This steam can for instance be utilized for operating a turbine, which produces electrical energy. When the indirect cooling in the condenser is effected by means of gas (e.g. air), the energy of the heated gas can also usefully be passed on outside the condenser, and for instance preheated air can be used as combustion air.

Preferably, at least 80% of the theoretically possible sulfuric acid are formed in the condenser, which are withdrawn as condensate. This sulfuric acid usually has a $H_2SO_4$ concentration of at least 97 wt-%.

Embodiments of the process will now be explained with reference to the drawing, wherein:

FIG. 2 shows a condenser designed as electrostatic precipitator.

Figure 1:
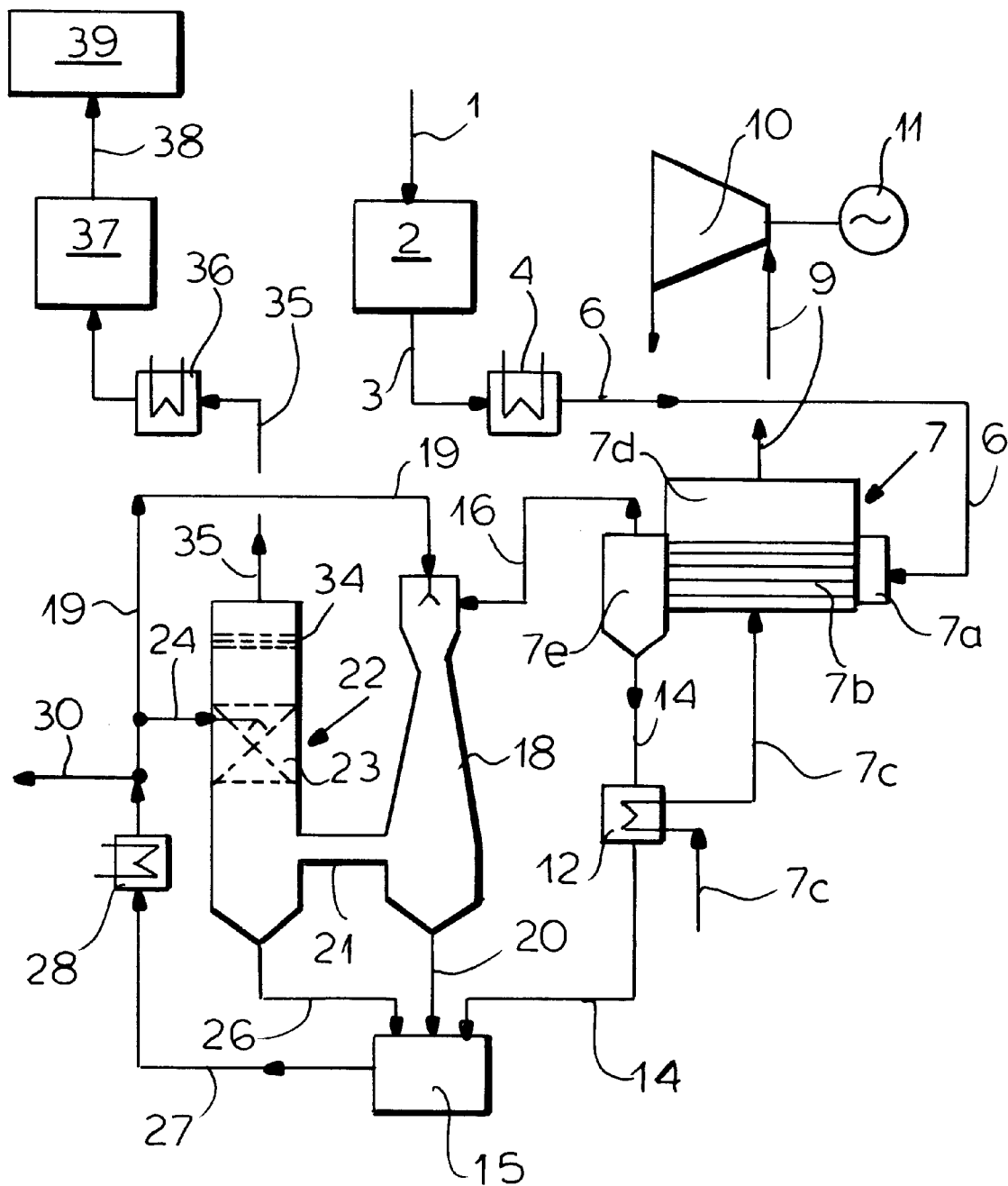
FIG. 1 shows a flow diagram of the process.

Through line 1, see FIG. 1, $SO_2$-containing gas is supplied, e.g. gas from a sulfur combustion or another $SO_2$ source. Usually, the gas also contains steam and air. The gas in line 1 is treated in a first plant 2 for the catalytic $SO_2$ oxidation. Plants of this type are known. At a temperature of usually 400–600° C. a gas mixture containing $SO_3$ and steam leaves the plant 2 via line 3 and is first of all passed through an indirect cooler 4, which serves the pre-cooling of the gas mixture. Usually, the gas mixture in line 3 also contains $SO_2$. In the cooler 4, the gas mixture is cooled to temperatures of 300° C., so that a condensation does not yet take place. The cooler 4 is expedient for the recovery of energy, but not absolutely necessary.

The steam-containing gas mixture in line 6 has a temperature in the range from 300–600° C. and a pressure of 0.8 to 2 bar. This gas mixture is cooled in the condensers to a temperature in the range from 180–240° C., where sulfuric acid is condensed. The condenser 7 comprises an inlet chamber 7a, a bundle of about horizontal tubes 7b, a supply line 7c for cooling fluid, a cooling fluid chamber 7d, and an outlet chamber 7e. Expediently, the cooling fluid is preheated in the heat exchanger 12, before it enters the condenser 7. The cooling fluid heated in the condenser to a temperature of at least 130° C. and preferably at least 150° C. is discharged via line 9. When water is supplied as cooling fluid through line 7c, steam is generated, which is discharged via line 9 at a pressure of about 3–10 bar. In the process illustrated in the drawing, the steam flows to an expansion turbine 10, which drives an electric generator 11.

While the gas mixture containing $SO_3$ and steam flows through the tubes 7b and is cooled in the process, there is first of all formed vaporous sulfuric acid. During the further cooling in the tubes 7b, the sulfuric acid formed will condense and flow first to the outlet chamber 7e with a $H_2SO_4$ content of about 98 to 100%, and then through line 14 to a collecting tank 15. The conditions in the condenser 7 are chosen such that at least 50% and preferably at least 80% of the theoretically possible sulfuric acid, which can be formed from existing $SO_3$ plus $H_2O$, is condensed and withdrawn.

From the outlet chamber 7e, a gas mixture containing residual $SO_3$ is withdrawn through line 16, which gas mixture usually also contains $O_2$, $SO_2$ and sulfuric acid vapor. This gas mixture flows to a first contact zone 18 of the type of a Venturi scrubber, which serves as $SO_3$ absorber. Concentrated sulfuric acid is supplied through line 19 and sprayed into the first contact zone 18. Discharged sulfuric acid flows through line 20 into the collecting tank 15. The residual gases flow through a connecting passage 21 into a second contact zone 22, an $SO_3$ absorption column with a packed bed 23, and a supply line 24 for concentrated sulfuric acid. In the zone 22 the gases flow upwards in contact with sulfuric acid trickling downwards. From the lower portion of the second contact zone 22 the concentrated sulfuric acid flows through line 26 likewise into the collecting tank 15. From the tank 15 concentrated sulfuric acid is withdrawn via line 27, is passed through an indirect cooler 28, where the temperature of the cooled sulfuric acid is brought into the range from 60 to 120° C. and usually from 70 to 100° C. Part of the cooled sulfuric acid is discharged as product acid through line 30, whereas the major part circulates through line 24 to the second contact zone 22 and through line 19 to the first contact zone 18. Usually, the concentration of the sulfuric acid in line 27 lies in the range from 97–99.5 wt-% $H_2SO_4$. In the case of relatively small gas quantities in line 16, the first contact zone 18 may be omitted, and the gas may be passed directly to the lower portion of the second contact zone 22, which is, however, not illustrated in the drawing.

The residual gas flowing upwards in the second contact zone 22 reaches a mist eliminator 34 and then leaves the contact zone via line 35. This gas is virtually free from $SO_3$, steam and sulfuric acid vapor, and above all still contains $SO_2$ and $O_2$. The residual gas is passed through a heat exchanger 36, where it is heated to the inlet temperature of 380–420° C., which in the succeeding second plant 37 is necessary for the catalytic $SO_2$ oxidation. For the further production of sulfuric acid, $SO_3$-containing gas formed is supplied through line 38 to a final absorption stage 39, which operates for instance in a manner known per se, which is not represented in detail in the drawing: The gas in line 38 is indirectly cooled to 140–200° C., and in an $SO_3$ absorption column containing a packed bed is trickled with concentrated sulfuric acid (98–99.5 wt-% $H_2SO_4$). The plant 37 and the stage 39 are, however, not necessary in any case, and above all serve the observance of environmental regulations. Instead of the plant 37 and the stage 39, gas scrubbing methods known per se can also be used.

The variant of the condenser 7 schematically represented in FIG. 2 is designed as wet-type electrostatic precipitator. In the inlet chamber 7a, the steam-containing gas mixture supplied via line 6 is sprayed with sulfuric acid from line 40 and the distributor 41, in order to increase the moisture of the gas, which is important for the efficiency of the electrostatic precipitator. The electrostatic precipitator comprises numerous precipitating electrodes 42, which are for instance designed as tubes, through which flows the gas mixture. The counter-electrodes in the form of ionizer wires 43, which are associated to the precipitating electrodes, are indicated in dotted lines. The cooling fluid, which flows around the precipitating electrodes, flows in through line 7C and out through line 9. By means of the electrostatic precipitator, mist droplets are removed from the gas mixture very efficiently. Gas and condensed sulfuric acid flow through the passage 44 to the outlet chamber 7e, where the gas is discharged via line 16 and subjected to a further treatment as it is explained in conjunction with FIG. 1. The sulfuric acid is discharged via line 14, see also FIG. 1, and in part recirculated via line 40.

EXAMPLES

There is used a plant in accordance with FIG. 1 of the drawing, where water is supplied to the condenser 7 as coolant, and saturated steam is withdrawn via line 9. In any case, the water is boiler feed water supplied at a temperature of 105° C., which is preheated in the heat exchanger 12 to an elevated temperature. The plant components 10, 11, 37 and 39 are omitted. The data have been calculated in part.

Example 1

For the production of 110 daily tons $H_2SO_4$ an $SO_2$ gas of metallurgical origin is used, which is charged into a conventional plant 2 for the catalysis of $SO_2$. Gas quantities, gas components and temperatures in various lines are indicated in

TABLE I

| Line | 3 | 6 | 16 | 35 |
| --- | --- | --- | --- | --- |
| Gas quantity ($Nm^3/h$) | 11,517 | 11,151 | 9,726 | 9,626 |
| $SO_3$ (kg/h) | 3,480 | 2,175 | 179 | <0.1 |
| $H_2O$ (kg/h) | 792 | 498 | — | — |
| $H_2SO_4$ (kg/h) | — | 1,599 | 517 | <0.2 |
| Temperature (° C.) | 465 | 380 | 200 | 80 |

The cooling water in an amount of 3,500 kg/h was first of all preheated to 140° C. through an indirect heat exchange with the condensate in line 14, before it entered the condenser 7. Via line 9, 3,356 kg/h saturated steam of 7 bar were withdrawn.

Example 2

For the production of 500 daily tons $H_2SO_4$ $SO_2$-containing calcination gases from the calcination of zinc concentrate are used. The contact zone 18 is omitted.

TABLE II

| Line | 3 | 6 | 16 | 35 |
| --- | --- | --- | --- | --- |
| Gas quantity ($Nm^3/h$) | 59,859 | 56,886 | 52,233 | 51,459 |
| $SO_3$ (kg/h) | 15,400 | 4,774 | 1,024 | — |
| $H_2O$ (kg/h) | 3,363 | 972 | — | — |
| $H_2SO_4$ (kg/h) | — | 13,017 | 2,220 | <0.6 |
| Temperature (° C.) | 490 | 320 | 205 | 80 |

The gas in line 35 is passed through the heat exchanger 4. The boiler feed water entering the condenser 7 in an amount of 12,130 kg/h has been preheated to 150° C. 10,178 kg/h saturated steam of 7 bar are generated and withdrawn via line 9.

Example 3

There is processed an acid gas from the desulfurization plant of an oil refinery. Together with the gas liquid sulfur is burnt, in order to enrich the gas with $SO_3$. The cooler 4 serves the superheating of saturated steam of 42 bar to 360° C.

TABLE III

| Line | 3 | 6 | 16 | 35 |
| --- | --- | --- | --- | --- |
| Gas quantity ($Nm^3/h$) | 13,206 | 13,138 | 12,349 | 12,277 |
| $SO_3$ (kg/h) | 1,528 | 1,282 | 96 | <0.5 |
| $H_2O$ (kg/h) | 332 | 277 | — | — |
| $H_2SO_4$ (kg/h) | 439 | 740 | 198 | <0.1 |
| Temperature (° C.) | 420 | 390 | 185 | 75 |

From 2.675 kg/h water, which enters the condenser 7 after having been preheated to 123° C., 2,620 kg/h saturated steam of 5 bar are generated. In the cooler 36 2,600 kg/h saturated steam of 42 bar are superheated from 253° C. to 360° C.

Example 4

For the production of 1,500 daily tons $H_2SO_4$ an $SO_2$ gas from a gold ore calcination plant are used.

TABLE IV

| Line | 3 | 6 | 16 | 35 |
| --- | --- | --- | --- | --- |
| Gas quantity ($Nm^3/h$) | 108,277 | 103,268 | 83,720 | 82,234 |
| $SO_3$ (kg/h) | 48,395 | 30,490 | 3,980 | <2.0 |
| $H_2O$ (kg/h) | 10,267 | 6,238 | — | — |
| $O_2$ (kg/h) | 12,524 | 12,524 | 12,524 | 12,524 |
| $H_2SO_4$ (kg/h) | — | 21,934 | 1,757 | <1.2 |
| Temperature (° C.) | 463 | 370 | 190 | 85 |

From 40,000 kg/h boiler feed water, preheated to 141 C., an amount of 38,700 kg/h saturated steam of 7 bar is generated, which is withdrawn via line 9.

What is claimed is:

1. A process for producing sulfuric acid from a gas containing sulfur dioxide and steam which comprises the steps of:
   (a) catalytically oxidizing the sulfur dioxide in said gas to sulfur trioxide to obtain a gas mixture which contains $SO_3$ and $H_2O$ in a molar ratio of at least 1:1 and is at a temperature of 400 to 600° C.;
   (b) passing the gas mixture containing $SO_3$ and $H_2O$ through a condenser in which the gas mixture is indirectly cooled by means of a cooling fluid so that at least 80% of the theoretically possible sulfuric acid is formed and condensed;

(c) withdrawing from said condenser condensed sulfuric acid at a concentration of at least 97 weight % at a temperature of 180 to 240° C.;

(d) withdrawing the cooling fluid from said condenser;

(e) withdrawing an $SO_3$-containing residual gas mixture from the condenser;

(f) directly charging the $SO_3$-containing residual gas mixture and concentrated sulfuric acid into a contact vessel at a temperature of 60 to 120° C. to form additional concentrated sulfuric acid from the $SO_3$-containing residual gas; and (g) withdrawing the concentrated sulfuric acid obtained during step (f).

2. The process defined in claim 1 wherein the cooling fluid supplied to the condenser is water, and steam of 2.5 to 10 bar is generated in the condenser.

3. The process defined in claim 1 wherein following step (a) the gas mixture containing $SO_3$ and steam is subjected to a pre-cooling without formation of a condensate, before the gas mixture is introduced into the condenser.

4. The process defined in claim 1 wherein the condenser is an electrostatic precipitator with cooled electrodes.

5. The process defined in claim 1 wherein following step (d) the cooling fluid withdrawn from the condenser is fed into a turbine for generating electricity.

* * * * *